(12) United States Patent
Hakala et al.

(10) Patent No.: US 11,066,059 B2
(45) Date of Patent: Jul. 20, 2021

(54) SYSTEM FOR CONTROLLING AN AIR CUSHION VEHICLE BY PROPELLER TOWERS AND A PROPELLER TOWER

(71) Applicants: Asko Hakala, Espoo (FI); Pentti Hakala, Espoo (FI)

(72) Inventors: Asko Hakala, Espoo (FI); Pentti Hakala, Espoo (FI)

(*) Notice: Subject to any disclaimer, the term of this patent is extended or adjusted under 35 U.S.C. 154(b) by 80 days.

(21) Appl. No.: 16/608,089

(22) PCT Filed: Apr. 24, 2018

(86) PCT No.: PCT/FI2018/050294
§ 371 (c)(1),
(2) Date: Oct. 24, 2019

(87) PCT Pub. No.: WO2018/197749
PCT Pub. Date: Nov. 1, 2018

(65) Prior Publication Data
US 2021/0101579 A1  Apr. 8, 2021

(30) Foreign Application Priority Data

Apr. 26, 2017 (FI) .................................. 20177054

(51) Int. Cl.
*B60V 1/11* (2006.01)
*B60V 1/14* (2006.01)
(52) U.S. Cl.
CPC . *B60V 1/11* (2013.01); *B60V 1/14* (2013.01)
(58) Field of Classification Search
CPC .................................. B60V 1/11; B60V 1/14
See application file for complete search history.

(56) References Cited

U.S. PATENT DOCUMENTS

| 1,842,125 A | 1/1932 | Schwarz |
| 3,205,960 A * | 9/1965 | Sperazz, Sr. ............. B60V 1/11 180/117 |

(Continued)

FOREIGN PATENT DOCUMENTS

| DE | 1227286 B | 10/1966 |
| FR | 2397963 A2 | 2/1979 |

(Continued)

OTHER PUBLICATIONS

Decision to Grant for Russian Application No. 2019104969/11, dated Oct. 28, 2019, 14 pages.

(Continued)

*Primary Examiner* — Kevin Hurley
(74) *Attorney, Agent, or Firm* — Cantor Colburn LLP (57) ABSTRACT

The invention relates to a control system for an air cushion vehicle (400) for the purpose of improving maneuverability of the air cushion vehicle. The system includes four propeller towers (401-404), propellers installed at the propeller towers, and mounting seats for mounting the propeller towers to the air cushion vehicle. In the system, an edge portion (442) located closest to a side wall N of the air cushion vehicle in the mounting seat is located closer to the ground than an opposite edge portion (446) in relation to a pivot point in the mounting seat, providing a tilt (450) of the propeller in response to rotation of the mounting seat at the pivot point, and in response to the rotation of the mounting seat, the propeller tower directs an air flow (452) produced with the propeller over the side wall of the air cushion vehicle and, due to the tilt of the propeller, partly downwardly relative to a horizontal plane defined by the ground, the air flow exerting a force (462) that lifts the side wall of the air cushion vehicle upwardly from the ground.

16 Claims, 4 Drawing Sheets

(56) References Cited

U.S. PATENT DOCUMENTS

| | | | |
|---|---|---|---|
| 3,827,527 A | | 8/1974 | Bertelsen |
| 4,828,058 A | * | 5/1989 | Bjorn-Ake ............... B60V 1/14 114/67 A |
| 5,279,379 A | * | 1/1994 | Sixsmith ................. B60V 1/14 180/117 |
| 6,715,574 B1 | | 4/2004 | Bertelsen et al. |
| 2005/0095930 A1 | | 5/2005 | Garcia |
| 2007/0187547 A1 | | 8/2007 | Kelly |

FOREIGN PATENT DOCUMENTS

| | | | | |
|---|---|---|---|---|
| GB | 921267 A | * | 3/1963 | ............... B60V 1/14 |
| GB | 1087543 | | 10/1967 | |
| GB | 2094734 A | | 9/1982 | |
| GB | 1475084 | | 6/1997 | |

OTHER PUBLICATIONS

Extended European Search Report for European Application No. 18790400.8, dated Sep. 26, 2019, 10 pages.
Written Opinion of International Search Report for International Application No. PCT/FI2018/050294, International Filing Date Apr. 24, 2018, dated Jul. 2, 2018, 5 pages.

* cited by examiner

SYSTEM FOR CONTROLLING AN AIR CUSHION VEHICLE BY PROPELLER TOWERS AND A PROPELLER TOWER

CROSS REFERENCE TO RELATED APPLICATIONS

This application is a National Stage application of PCT/FI2018/050294, filed Apr. 24, 2018, which claims the benefit of Finnish Application No. 20177054, filed Apr. 26, 2017, both of which are incorporated by reference in their entirety herein.

TECHNICAL FIELD the invention generally relates to configuration of air-impelling propellers in an air cushion vehicle and directing the propellers.

TECHNICAL BACKGROUND

An air cushion vehicle is a vessel for moving on water, ice, bog or other places, over a relatively flat area. The cushion in the air cushion vehicle is formed by a number or air bags and a skirt enclosing the air bags. The air cushion vehicle is provided with an engine for driving air to the air bags so as to provide positive pressure in the air bags. Due to the positive pressure, the air cushion vehicle rises slightly upwards from its location, and hovers above an air mass, because the air mass released from the air bags remains for a short time between ground and the vehicle. Below the term 'ground' will be used, but there may be for example soil, vegetation, water or ice or their combination below the air cushion vehicle.

The air cushion vehicle includes at least one airplane propeller or a corresponding propeller for moving the air cushion vehicle above the air mass. The propeller may be rotated with the same engine that drives air to the bags in the cushion. In large air cushion vehicles there are at least two engines, one of the engines being configured for inflating the cushion, while another engine is configured for rotating the propeller. The propeller or propellers is/are typically located at the back, i.e. stern, of the air cushion vehicle. When the propeller or propellers is/are located at the stern of the vehicle, the vehicle resembles a rear-wheel-driven car. The difference between the rear-wheel-driven car and the air cushion vehicle is the amount of friction. More specifically, there is very little friction between the air cushion vehicle and ground, and the lack of friction makes the air cushion vehicle difficult to be maneuvered (compared to the car).

Figure 1:
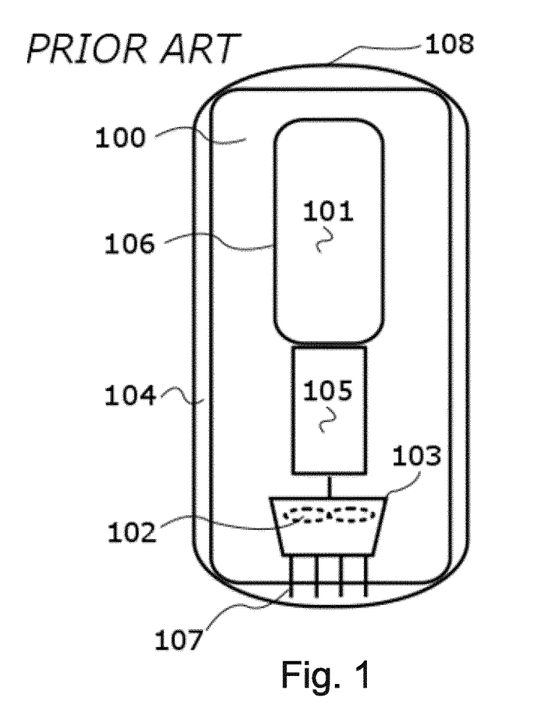
FIG. 1 is a bird's-eye view of an air cushion vehicle.

FIG. 1 is a bird's-eye view of an air cushion vehicle 100 of the prior art. The vehicle 100 includes a cockpit 101 for accommodating, in addition to the driver of the vehicle 100, some passengers and/or cargo, for example 1500 kg. A propeller 102 of the vehicle with its support structure and tunnel 103 are located at the stern of the vehicle 100. The propeller 102 is located inside the tunnel 103 that directs the air flow. An internal combustion engine 105 for the cushion 104 and the propeller 102 of the vehicle 100 is located between the propeller 102 and the cockpit 101. The internal combustion engine 105 rotates the propeller 102 via shafts and pinions. A door 106 located on the side of the vehicle 100 gives access to the cockpit 101.

Guide vanes 107 are mounted to the support structure of the propeller 102 for directing the air flow produced by the propeller 102 to the right or the left side of the vehicle 100, whereby the bow 108 of the vehicle 100 turns right or left, respectively.

Figure 2:
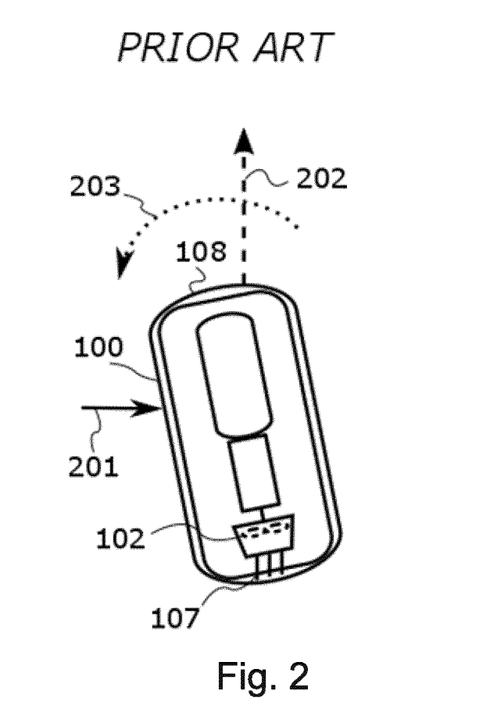
FIG. 2 illustrates maneuvering difficulties caused by crosswind.

FIG. 2 illustrates maneuvering difficulties, as seen from a bird's-eye view, caused by crosswind 201 for the driver of the air cushion vehicle 100 on a desired route 202 (indicated with a dash line). The force exerted by the crosswind 201 towards the air cushion vehicle 100 may vary, for example depending on whether any island would shelter the air cushion vehicle 100 from wind, or whether the wind would hit the vehicle unobstructed?

In FIG. 2 the driver has turned the guide vanes 107 of the air cushion vehicle 100 to the left, due to which the bow 108 of the vehicle has turned left, partly towards the crosswind 201. In this case, the air cushion vehicle 100 proceeds on the desired route 202 with a right side wall slightly leading. The combined effect of the forces resulting from the crosswind 201 and the propeller 102 is such that the moving direction of the air cushion vehicle 100 corresponds to the route 202. If the speed of the air cushion vehicle 100 is relatively high and the crosswind 201 suddenly ceases, the vessel may spin around as indicated by arrow 203. Another problem is to control the air cushion vehicle 100 in such a way that it will not collide straight with a large wave.

Figure 3:
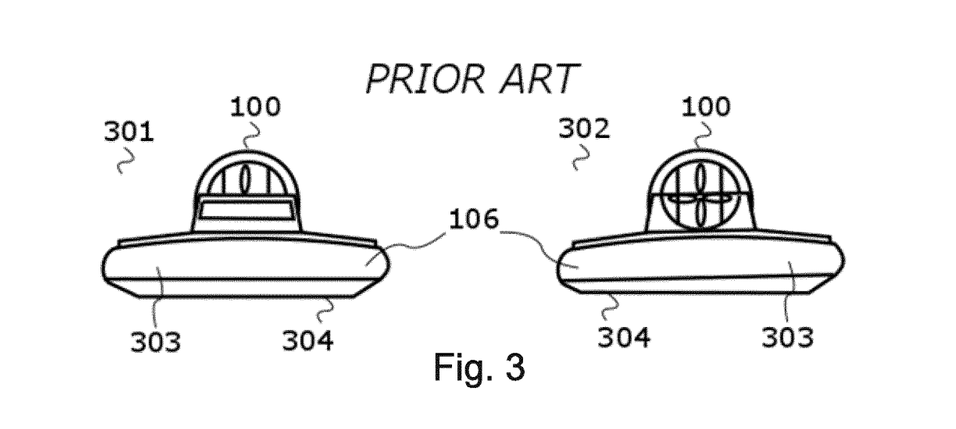
FIG. 3 illustrates turning by an air cushion vehicle.

FIG. 3 shows two views 301 and 302 of the air cushion vehicle 100 when the driver is turning the vehicle 100.

The first view 301 is a front view of the vessel 100. The lower part of the skirt 303 of the cushion 104 is formed by replaceable segments called fingers 304. In one known system, turning of the vehicle 100 is aided by reducing the air mass on the side of the cushion 104 where one is about to turn.

The second view 302 shows the vessel 100 directly from the backside. The vessel 100 has tilted left, because the air mass has been reduced on the left side of the cushion 104. Reducing the air mass increases friction between the vessel 100 and ground. More specifically, friction increases on the left side because the bags in the cushion 104 and the fingers 304 of the skirt 303 touch the ground on the left side. Increasing the friction facilitates turning the vessel 100 (in this case to the left), but the downside of friction is that the bags and fingers 304 of the cushion 104 wear down.

Controlling the air cushion vehicle 100 requires special skills for example when docking because the vessel should not hit the quay at a speed that is too high. Another example of a situation requiring skill is a sea rescue operation where the vessel 100 should be steered close to a person being rescued from the sea.

U.S. Pat. No. 3,208,543 represents an air cushion vehicle of the prior art, in one embodiment of which two air openings are arranged on each of the side walls of the vessel in such a way that one of the air openings is located in proximity to the bow and the other one in proximity to the stern. The vessel may be controlled by directing the air produced by the vessel to one or more of the air openings. The vessel can be moved sideways or spun around, as needed.

U.S. Pat. No. 3,827,527 represents a ground effect vehicle of the prior art, in one embodiment of which the vehicle includes two propellers, one propeller at the front part of the vehicle and the other propeller at the rear part of the vehicle. Both of the propellers are mounted to the vehicle with a support structure that is rotatable relative to the deck of the vehicle. Further, the support structure and the propeller mounted thereto are tiltable relative to the deck of the vehicle. The vessel can be moved sideways or spun around, as needed.

Possibly the closest prior art is represented by air cushion vehicle SR.N4 (Saunders-Roe Nautical 4) used for operations across the English Channel. This SR.NR vehicle has an upper deck below which there is a passenger cabin for 254 passengers and a hold for 30 cars. Two propeller towers are mounted at the front part of the upper deck, and two propeller towers are mounted at the rear part of the upper deck. Each propeller tower contains one (large) propeller, and each propeller tower is rotatable relative to the SR.NR vehicle. Due to four rotatable propeller towers, the controllability of the SR.NR vehicle is better than the controllability of many other air cushion vehicles.

The following problems are encountered in air cushion vehicles. The first problem is wearing of the air bags and the skirt due to friction. This wearing occurs because turning of the vehicle is enhanced by reducing the air in the cushion on the side where the bow of the vehicle is to be turned. The second problem is controlling the air cushion vehicle under heavily varying wind conditions. The third problem is imprecise control when the air cushion vehicle moves at slow speed. Precise control is needed for example in sea rescue operations or during docking. Precise control is also needed at high speed, for example to avoid rocks.

SUMMARY OF THE INVENTION

One aspect relating to the air cushion vehicle according to the invention is a need to solve the above-mentioned problems. The solutions will be briefly presented below.

Wearing of the air bags and the skirt of the cushion is prevented by maintaining a constant amount of air in the cushion during a drive, so as to avoid friction due to reducing the air, which wears the cushion.

Varying wind conditions can be better handled by positioning propeller towers at the corners of the air cushion vehicle.

For precise control of the air cushion vehicle, the propeller in each of the propeller towers is tiltable either towards the ground or away from the ground.

The invention relates to a control system for an air cushion vehicle, including four propeller towers, propellers installed at the propeller towers, and mounting seats for mounting the propeller towers to the air cushion vehicle. The mounting seats used in the system are configured in a special way. More specifically, rotating the mounting seat at its pivot point affects the position (tilt) of the propeller installed at the propeller tower relative to the ground, and the position (tilt) of the propeller produces a force that pushes a side wall of the air cushion vehicle towards the ground, or alternatively lifts a side wall of the air cushion vehicle away from the ground. This side wall pushing force (or lifting force) facilitates controlling the air cushion vehicle. One to four propeller towers are used for positioning the air cushion vehicle relative to the ground.

As an example, a mounting seat located on the right side at the bow of the air cushion vehicle, a propeller tower mounted thereto, and a propeller installed at the propeller tower will be discussed. In the system, an edge portion located closest to a right side wall of the air cushion vehicle in the mounting seat is located closer to the ground than an opposite edge portion in relation to the pivot point in the mounting seat, providing a tilt of the propeller in response to rotation of the mounting seat at the pivot point, and in response to the rotation of the mounting seat, the propeller tower directs an air flow produced with the propeller over the right side wall of the air cushion vehicle and, due to the tilt of the propeller, partly downwardly relative to a horizontal plane defined by the ground, the air flow exerting a force that lifts the right side wall of the air cushion vehicle upwardly from the ground.

LIST OF FIGURES

The invention will now be described in more detail with reference to the accompanying figures.

DETAILED DESCRIPTION OF THE INVENTION

It is to be noted that the embodiments presented in the description are given by way of example, and although a text describing an embodiment may include reference to another embodiment, such reference is generally only one alternative. Features relating to different embodiments may be combined in order to form new embodiments.

Figure 4:
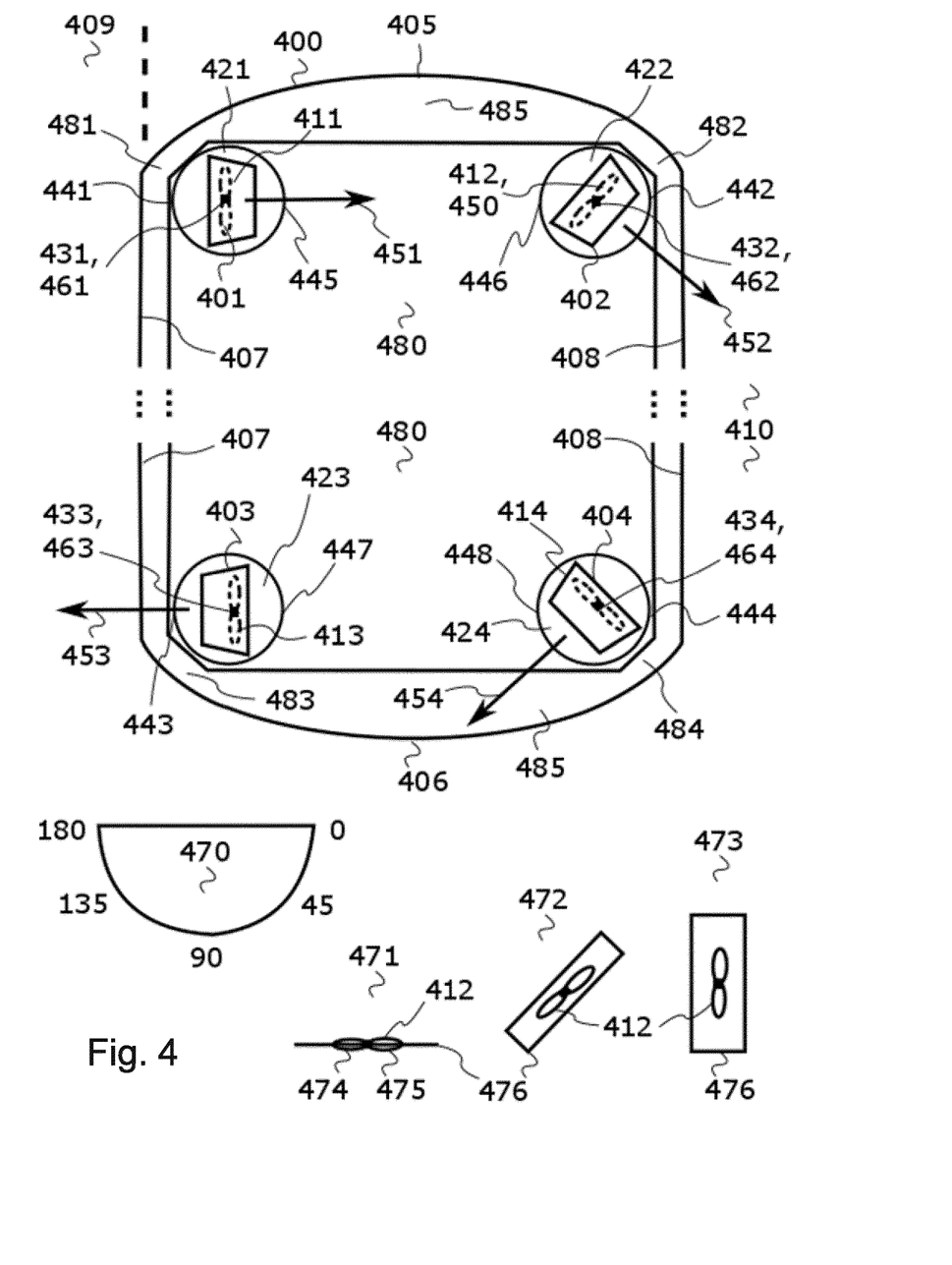
FIG. 4 is a bird's-eye view of the control system according to the invention.

FIG. 4 is a bird's-eye view of a control system, abbreviated 'system', including four propeller towers 401-404 that are rotatable relative to an air cushion vehicle 400. The air cushion vehicle 400 may include a covered cockpit, but the cockpit may as well be uncovered. Thus, the centre part and the cockpit located between a bow 405 and a stern 406 of the air cushion vehicle 400 are not illustrated in the figure. The system is purposed for controlling the air cushion vehicle 400 by the rotatable propeller towers 401-404, wherein a first propeller tower 401 and a second propeller tower 402 are located in proximity to the bow 405 of the air cushion vehicle 400, and a third propeller tower 403 and a fourth propeller tower 404 are located in proximity to the stern 406 of the air cushion vehicle.

Further, as illustrated by FIG. 4, the first propeller tower 401 and the third propeller tower 403 are located in proximity to a first side wall 407 of the air cushion vehicle 400, and the second propeller tower 402 and the fourth propeller tower 404 are located in proximity to a second side wall 408 of the air cushion vehicle 400. The first side wall 407 defines a first side 409 relative to the air cushion vehicle 400, and the second side wall 408 defines a second side 410 relative to the air cushion vehicle 400.

The system includes propellers 411-414 for moving the air cushion vehicle 400, including a first propeller 411 for the first propeller tower 401, a second propeller 412 for the second propeller tower 402, a third propeller 413 for the third propeller tower 403, and a fourth propeller 414 for the fourth propeller tower 404.

Further, the system includes mounting seats 421-424 for mounting the propeller towers to the air cushion vehicle, a first mounting seat 421 for the first propeller tower, a second mounting seat 422 for the second propeller tower, a third mounting seat 423 for the third propeller tower, and a fourth mounting seat 424 for the fourth propeller tower, such that the first mounting seat is rotatable at a first pivot point 431, the second mounting seat is rotatable at a second pivot point 432, the third mounting seat is rotatable at a third pivot point 433, and the fourth mounting seat is rotatable at a fourth pivot point 434 relative to the air cushion vehicle.

In the system, an edge portion 442 located closest to the second side wall 408 in the second mounting seat 422 is located closer to the ground than an opposite edge portion 446 in relation to the second pivot point 432 in the second mounting seat 422, providing a tilt 450 of the second propeller 412 in response to rotation of the second mounting seat 422 at the second pivot point 432. Then, in response to the rotation of the second mounting seat 422, the second propeller tower 402 directs a second air flow 452 produced with the second propeller 412 over the second side wall 408 and, due to the tilt of the second propeller 412, partly downwardly relative to a horizontal plane defined by the ground, the second air flow 452 exerting a second force 462 that lifts the second side wall 408 of the air cushion vehicle 400 upwardly from the ground.

Because the air cushion vehicle 400 is seen herein from the bird's-eye view, the force 462 lifting the second side wall 408, and other corresponding forces 461, 463, 464 are shown as points.

The tilt 450 of the second propeller 412 is described using a protractor 470 having a straight portion positioned perpendicular to the first side wall 407 (and to the second side wall 408) of the air cushion vehicle 400, and a curved portion curving towards the stern 406 of the air cushion vehicle 400. The curved portion of the protractor 470 is marked with degree values 0, 45, 90, 135 and 180. The second propeller 412 is seen from three bird's-eye views 471, 472 and 473 in which the propeller 412 is presented with two blades, but the number of blades may also be greater.

In the first view 471, the blades 474, 475 of the propeller 412 are positioned perpendicular to the second side wall 408. In other words, if the second propeller 412 rotates, it produces an air flow 452 with a degree value 90 according to the protractor 470. In the first view 471, the second propeller 412, more specifically the rotating blades 474, 475 thereof define a plane 476. The plane 476 is positioned perpendicular to the ground, so the plane 476 is shown as a line as seen from the bird's-eye view.

In the second view 472 it is assumed that the second propeller tower 402 has been rotated such that the degree value of the air flow 452 produced by the second propeller 412 is 45. The rotation of the second propeller tower 402 provides a tilt 450 of the second propeller 412 towards the second side 410 defined by the second side wall 408. The tilt 450 is illustrated by plane 476. The tilt 450 is provided by a mounting seat 422 in which the edge portion 442 located closest to the second side wall 408 in the second is continuously located, during rotation, closer to the ground than the opposite edge portion 446 in relation to the second pivot point in the second mounting seat 422.

In the third view 473 it is assumed that the second propeller tower 402 has been rotated further, such that the degree value of the air flow 452 produced by the second propeller 412 is 0, i.e. the propeller tower 402 is rotated to one of its extremities. In this case, the plane 476 illustrating the tilt 450 is even more clearly noticeable than in the second view 472; in other words, the tilt 450 has increased compared to view 472. In one embodiment, the tilt 450 of the second propeller 412 is at most 20 degrees. In one embodiment, the second propeller 412 is tiltable by at least ten degrees towards the second side wall 408 in response to rotation of the second mounting seat 422.

In a corresponding manner (as propeller 412), propellers 411, 413 and 414 may be tilted by rotating their propeller tower.

In the system, an edge portion 441 located closest to the first side wall 407 in the first mounting seat 421 is located closer to the ground than an opposite edge portion 445 in relation to the first pivot point 431 in the first mounting seat 421, providing a tilt of the first propeller 411 in response to rotation of the first mounting seat 421 at the first pivot point 431. Then, in response to the rotation of the first mounting seat 421, the first propeller tower 401 directs a first air flow 451 produced with the first propeller 411 over the second side wall 408 of the air cushion vehicle 400 and, due to the tilt of the first propeller 411, partly upwardly relative to a horizontal plane defined by the ground, the first air flow 451 exerting a first force 461 that pushes the first side wall 407 of the air cushion vehicle 400 towards the ground.

In the system, an edge portion 443 located closest to the first side wall 407 in the third mounting seat 423 is located farther from the ground than an opposite edge portion 447 in relation to the third pivot point 433 in the third mounting seat 423, providing a tilt of the third propeller 413 in response to rotation of the third mounting seat 423 at the third pivot point 433. Then, in response to the rotation of the third mounting seat 423, the third propeller tower 403 directs a third air flow 453 produced with the third propeller 413 over the first side wall 407 of the air cushion vehicle 400 and, due to the tilt of the third propeller 413, partly upwardly relative to a horizontal plane defined by the ground, the third air flow 453 exerting a third force 463 that pushes the first side wall 407 of the air cushion vehicle 400 towards the ground.

In the system, an edge portion 444 located closest to the second side wall 408 in the fourth mounting seat 424 is located farther from the ground than an opposite edge portion 448 in relation to the fourth pivot point 434 in the fourth mounting seat 424, providing a tilt of the fourth propeller 414 in response to rotation of the fourth mounting seat 424 at the fourth pivot point 434. Then, in response to the rotation of the fourth mounting seat 424, the fourth propeller tower 404 directs a fourth air flow 454 produced with the fourth propeller 414 towards the first side 407 and, due to the tilt of the fourth propeller tower 401, partly downwardly relative to a horizontal plane defined by the ground, the fourth air flow 454 exerting a fourth force 464 that lifts the second side wall 408 upwardly from the ground.

FIG. 4 further shows a deck 480 of the air cushion vehicle 400 and corners 481-484 provided at the deck 480, the propeller towers 401-404 being installed at the corners. The deck 480 covers most of the cushion 485 of the air cushion vehicle 400, but a small portion of the skirt of the cushion 485 is illustrated. Generally, the deck 480 is configurable in many different ways (the deck does not necessarily have corners, and the deck may serve as a roof for the cockpit).

The air cushion vehicle 400 may include a cushion 485, the pressure of which is adjusted during operation, such that air is released from the bags of the cushion 485 on the side of the first side wall 407 or on the side of the second side wall 408 of the air cushion vehicle 400 in order to increase friction. However, the system according to the invention is specifically purposed for an air cushion vehicle 400 maintaining constant pressure in its cushion 485 during operation of the cushion. In this case, the configuration of the cushion 485 is simpler and less expensive, and its (fingers' and bags') wearing is reduced compared to an adjustable cushion.

In FIG. 4, the forces 461, 463 exerted by the first propeller 411 and the third propeller 413 push the first side wall 407 towards the ground, and the forces 462, 464 exerted by the second propeller 412 and the fourth propeller 414 lift the second side wall 408 away from the ground. The forces 461-624 are illustrated in the next two figures.

Figure 5A:
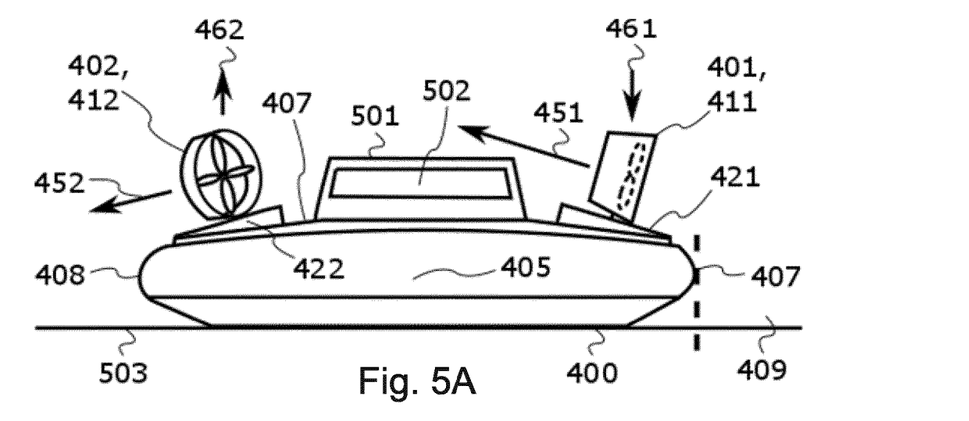
FIG. 5A shows the control system from the direction of the bow of an air cushion vehicle.

FIG. 5A shows the control system as seen from the direction of the bow 405 of the air cushion vehicle 400. In this example, the air cushion vehicle 400 includes a cockpit 501 and a windshield 502. The propeller towers located behind the cockpit 501 are not illustrated in the figure.

In response to rotation of the first propeller tower 401, the first air flow 451 produced by the first propeller 411 is directed perpendicular over the second side wall 408 and partly upwardly relative to a horizontal plane defined by ground 503, the air flow 451 exerting a force 461 that pushes the first side wall 407 of the air cushion vehicle 400 towards the ground 503. The downwardly directed force 461 is important because it facilitates positioning the air cushion vehicle 400 relative to the ground 503 (for example keeping the deck 480 horizontal).

In response to rotation of the second propeller tower 402, the air flow 452 produced by the second propeller 412 is directed obliquely (at an angle of) 45° over the second side wall 408 and partly downwardly relative to a horizontal plane defined by the ground 503, the air flow 452 exerting a force 462 that lifts the second side wall 408 of the air cushion vehicle 400 away from the ground 503. The upwardly directed force 462 facilitates positioning the deck 480.

By increasing the power for propeller 411 and/or 412 (for example by increasing revolutions per minute), the air cushion vehicle 400 can be tilted to the first side 409, which improves maneuverability of the air cushion vehicle 400 when turning.

Figure 5B:
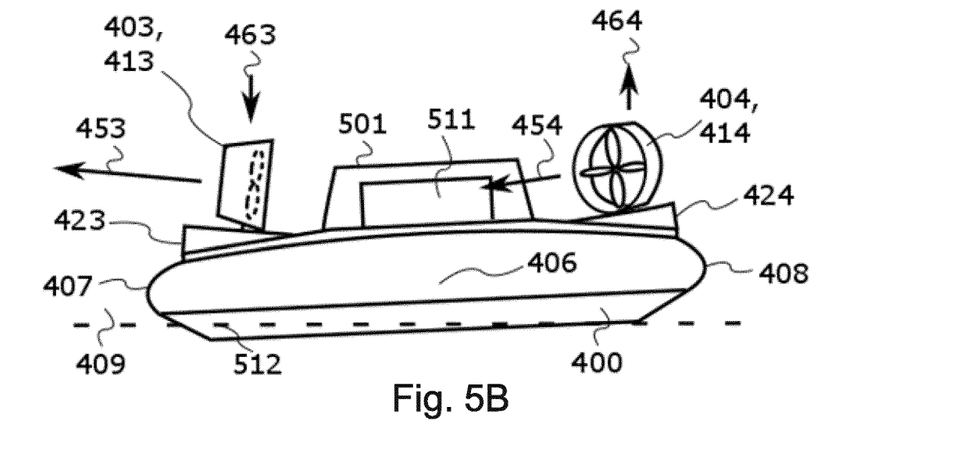
FIG. 5B shows the control system from the direction of the stern of an air cushion vehicle.

FIG. 5B shows the control system as seen from the direction of the stern 406 of the air cushion vehicle 400. The cockpit 501 of the air cushion vehicle 400 and an engine 511 located between the cockpit 501 and the stern 406 are illustrated in the figure. The propeller towers located in front of the cockpit 501 are not illustrated.

When the driver wants to turn the air cushion vehicle 400 to the first side 409, the first side wall 407 of the air cushion vehicle 400 tends to rise and the second side wall 408 tends to move lower during the turn. By operating at least one propeller 413, 414, this tilt caused by the laws of physics may be opposed to the extent that the air cushion vehicle 400 tilts in the opposite direction. In other words, when turning to the first side 409, the first side wall 407 of the air cushion vehicle 400 is located closer to the ground (bottom of the water) than the second side wall 408, as illustrated in the figure. The tilt of the air cushion vehicle 400 is emphasized with a dash line 512 representing the water surface. Because the tilt is provided without reducing air in the cushion of the air cushion vehicle 400, the parts in the cushion wear more slowly. Thus, the parts of the cushion (such as the bags and fingers) wear more slowly than for example in the air cushion vehicle 100 shown in FIG. 3.

In response to rotation of the third propeller tower 403, the air flow 453 produced by the third propeller 413 is directed perpendicular over the first side wall 407 and partly upwardly relative to a horizontal plane defined by the ground, the air flow 453 exerting a force 463 that pushes the first side wall 407 of the air cushion vehicle 400 to the ground.

In response to rotation of the fourth mounting seat, the air flow 454 produced by the fourth propeller 414 is directed towards the first side 409 and partly downwardly relative to a horizontal plane defined by the ground, the air flow 454 exerting a force 464 that lifts the second side wall 408 of the air cushion vehicle 400 upwardly from the ground.

Figure 6:
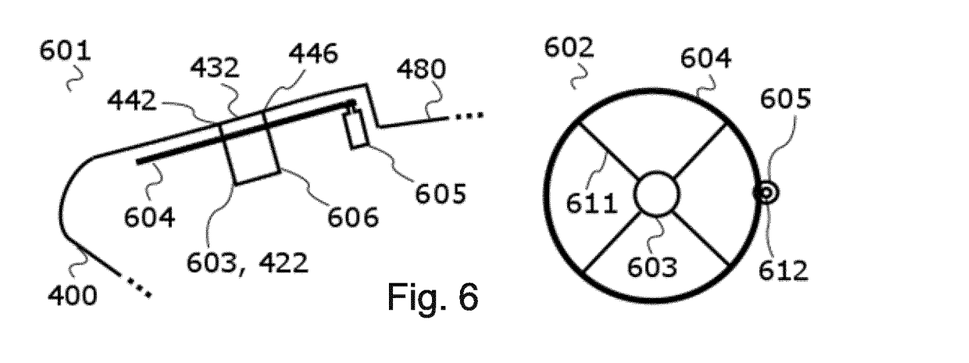
FIG. 6 shows one embodiment of a mounting seat.

FIG. 6 shows two views 601, 602 of one embodiment of the mounting seat 422. In the first view 601, only a small portion of the deck 480 of the air cushion vehicle 400 shown in FIG. 5A is illustrated, and the mounting seat 422 is seen from the direction of the bow 405 of the air cushion vehicle 400. In one embodiment, the mounting seat 422 includes a rotatable shaft 603 at the second pivot point for mounting the propeller tower. In one embodiment, the mounting seat 422 further includes a circular rack 604 mounted to the shaft 603, and an electric motor 605. A pinion mounted to the rotor of the electric motor 605 is configured to rotate the shaft 603 by rotating the rack 604. In addition to the pivot point 432, the shaft 603 is supported at point 606. The shaft 603 is hollow for introducing for example a power transmission shaft, an electric conductor or a pressure hose for mechanizing the propeller tower. The propeller tower is mountable to the end of the shaft 603 at the pivot point 432. The edge portion 442 located closest to the second side wall 408 of the air cushion vehicle 400 in the shaft 603 is located closer to the ground than the opposite edge portion 446 in relation to the pivot point 432 in the shaft 603.

In the second view 602, the mounting seat 422 is seen from a bird's-eye view in the direction of the shaft 603 in the mounting seat 422. The shaft 603 is mounted by support elements, including support element 611, to the rack 604. The pinion 612 of the electric motor 605 engages the rack 604.

Figure 7:
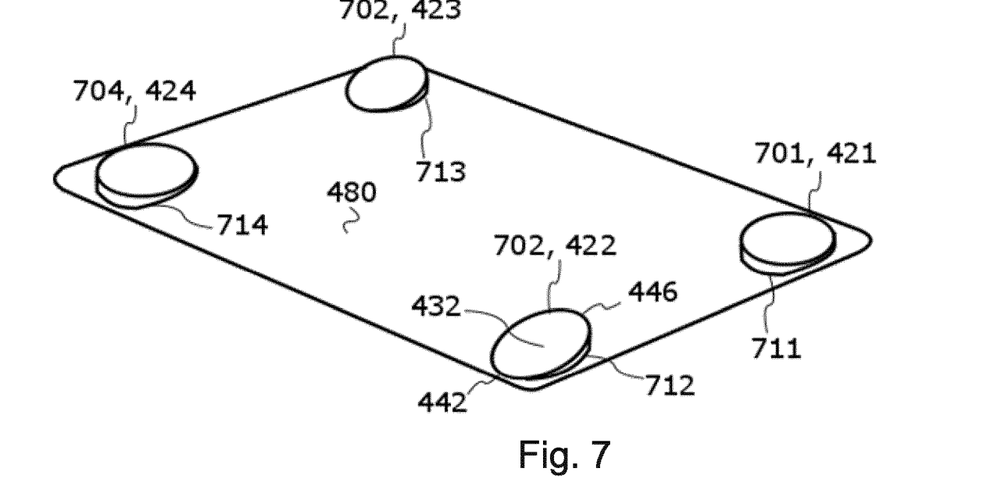
FIG. 7 shows an alternative embodiment of a mounting seat.

FIG. 7 shows an alternative embodiment of the mounting seat 422. The deck 480 includes four inclined caps 701-704 serving as mounting seats 421-424, respectively. The inclined caps 701-704 are mounted to the deck 480 by their edges 711-714, and each inclined cap 701-704 is rotatable relative to the deck 480.

For example, the second mounting seat 422 includes an inclined cap 702 at the second pivot point 432 for mounting the propeller tower. In one embodiment, the inclined cap 702 is mounted to the deck 480 by its edge 712 via a circular slide rail. In one embodiment, a circular rack is further mounted to the edge 712, so that the rack and the cap 702 may be rotated relative to the deck 480 with a motor provided with a pinion (the configuration is similar to that of FIG. 6).

Each inclined cap 701-704 in FIG. 7 is rotated to a position where the inclined cap 701-704 tilts the propeller furthest via the propeller tower.

Figure 8:
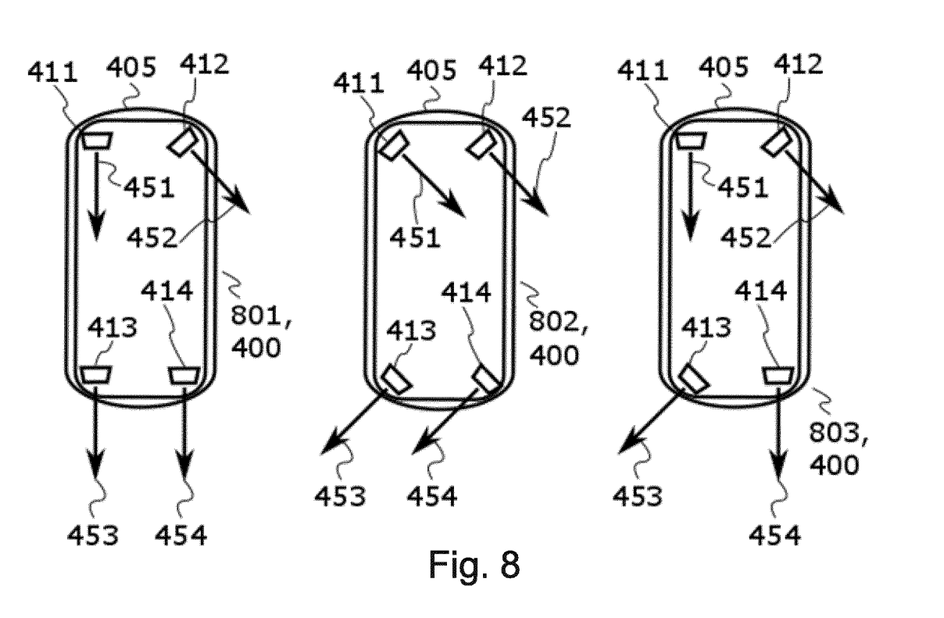
FIG. 8 shows examples of controlling an air cushion vehicle.

FIG. 8 shows three examples 801-803 of controlling the air cushion vehicle 400 by the propeller towers 411-414. The air cushion vehicle 400 may be maneuvered by operating one of the propeller towers 411-414 or by operating two, three or all four propeller towers simultaneously. Each propeller tower 411-414 of the air cushion vehicle 400 is rotatable by 180 degrees. In one embodiment, the blade angle of the propeller in the propeller tower 401-404 is adjustable, such that the air flow produced by the propeller changes to the opposite direction. In this case, the propeller is able to produce an air flow with a degree value between 0-360, so it is possible to reverse the air cushion vehicle 400.

In the first example 801, propeller towers 401, 403, 404 are directed such that the air flows 451, 453, 454 they produce are directed perpendicular towards the stern 406 of the air cushion vehicle 400, whereby the degree values relating to the air flows 451, 453, 454 are 90 according to the protractor 470. The air flows 451, 453, 454 are parallel to a plane defined by the ground. In this case, the blades of the propeller 411 for example in propeller tower 401 are positioned perpendicular to the first side wall 407.

The second example 802 illustrates how the first propeller tower 401 and the second propeller tower 402 may be operated as a pair in which the propellers produce parallel air flows 451, 452, and the degree values relating to the air flows 451, 452 are 45. In a corresponding manner, the third propeller tower 403 and the fourth propeller tower 404 may be operated as a pair to produce parallel air flows 453, 454.

The third example 803 illustrates turning the air cushion vehicle 400 slightly to the first side 409, such that the degree values of the air flows 451-454 produced by the propeller towers 401-404 are 90, 45, 135 and 90, respectively.

The details given hereinafter apply to all of the above-discussed figures and different embodiments of the control system.

The system is best suited for relatively small air cushion vehicles, for example air cushion vehicles of about 10 m in length and 5 m in width. In small air cushion vehicles, the propeller power is sufficient relative to the weight of the air cushion vehicle. In other words, by means of the tiltable propellers according to the system, the air cushion vehicle may be positioned in a desired manner relative to the ground. In large air cushion vehicles, it is more difficult (but not impossible) to compensate for the effect of wind, centrifugal force or other such force on the position of the air cushion vehicle by means of the propellers.

The system is well suited for example for air cushion vehicles used in sea rescue operations, because the system improves maneuverability of the air cushion vehicle, whereby the air cushion vehicle may be controlled with precision at slow speed and high speed.

The system allows the propellers to be motorized in a number of different ways. An electric motor, an internal combustion engine, a hydraulic motor or a pneumatic motor works as the power source for the propeller. The inclined cap to which the propeller tower is mounted may be provided with a lead-through for an electric cable, a fuel hose, a hydraulic hose or a pneumatic hose. Alternatively, a rotatable hollow shaft may be used as the mounting seat of the propeller tower for introducing the electric cable or said hose through the shaft.

It is obvious to a person skilled in the art that the embodiments and examples described above may be varied and combined with each other. The invention and its embodiments are not limited to the examples described above; instead they may vary within the scope of the claims.

The invention claimed is:

1. A system for controlling an air cushion vehicle (400) by propeller towers (401-404), wherein a first propeller tower (401) and a second propeller tower (402) are located in proximity to the bow (405) of the air cushion vehicle, a third propeller tower (403) and a fourth propeller tower (404) are located in proximity to the stern (406) of the air cushion vehicle, the first propeller tower and the third propeller tower are located in proximity to a first side wall (407) of the air cushion vehicle, the second propeller tower and the fourth propeller tower are located in proximity to a second side wall (408) of the air cushion vehicle, and the first side wall defines a first side (409) relative to the air cushion vehicle, the system including propellers (411-414) for moving the air cushion vehicle, including a first propeller (411) for the first propeller tower (401), a second propeller (412) for the second propeller tower (402), a third propeller (413) for the third propeller tower (403), and a fourth propeller (414) for the fourth propeller tower (404), and mounting seats (421-424) for mounting the propeller towers to the air cushion vehicle, a first mounting seat (421) for the first propeller tower, a second mounting seat (422) for the second propeller tower, a third mounting seat (423) for the third propeller tower, and a fourth mounting seat (424) for the fourth propeller tower, such that the first mounting seat is rotatable at a first pivot point (431), the second mounting seat is rotatable at a second pivot point (432), the third mounting seat is rotatable at a third pivot point (433), and the fourth mounting seat is rotatable at a fourth pivot point (434) relative to the air cushion vehicle, characterized in that in the system, an edge portion (442) located closest to the second side wall in the second mounting seat is located closer to the ground than an opposite edge portion (446) in relation to the second pivot point in the second mounting seat, providing a tilt (450) of the second propeller in response to rotation of the second mounting seat at the second pivot point, and in response to the rotation of the second mounting seat, the second propeller tower directs a second air flow (452) produced with the second propeller over the second side wall of the air cushion vehicle and, due to the tilt of the second propeller, partly downwardly relative to a horizontal plane defined by the ground, the second air flow exerting a second force (462) that lifts the second side wall of the air cushion vehicle upwardly from the ground.

2. The system according to claim 1, characterized in that the second propeller tilts by at least ten degrees towards the second side wall in response to rotation of the second mounting seat.

3. The system according to claim 1, characterized in that an edge portion (441) located closest to the first side wall in the first mounting seat is located closer to the ground than an opposite edge portion (445) in relation to the first pivot point in the first mounting seat, providing a tilt of the first propeller in response to rotation of the first mounting seat at the first pivot point, and in response to the rotation of the first mounting seat, the first propeller tower directs a first air flow (451) produced with the first propeller over the second side wall of the air cushion vehicle and, due to the tilt of the first propeller, partly upwardly relative to a horizontal plane defined by the ground, the first air flow exerting a first force (461) that pushes the first side wall of the air cushion vehicle towards the ground.

4. The system according to claim 1, characterized in that an edge portion (443) located closest to the first side wall in the third mounting seat is located farther from the ground than an opposite edge portion (447) in relation to the third pivot point in the third mounting seat, providing a tilt of the third propeller in response to rotation of the third mounting seat at the third pivot point, and in response to the rotation of the third mounting seat, the third propeller tower directs a third air flow (453) produced with the third propeller over the first side wall of the air cushion vehicle and, due to the tilt of the third propeller, partly upwardly relative to a horizontal plane defined by the ground, the third air flow exerting a third force (463) that pushes the first side wall of the air cushion vehicle towards the ground.

5. The system according to claim 1, characterized in that an edge portion (444) located closest to the second side wall in the fourth mounting seat is located farther from the ground than an opposite edge portion (448) in relation to the fourth pivot point in the fourth mounting seat, providing a tilt of the fourth propeller in response to rotation of the fourth mounting seat at the fourth pivot point, and in response to the rotation of the fourth mounting seat, the fourth propeller tower directs a fourth air flow (454) produced with the fourth propeller towards the first side and, due to the tilt of the fourth propeller tower, partly downwardly relative to a horizontal plane defined by the ground, the fourth air flow exerting a fourth force (464) that lifts the second side wall (408) upwardly from the ground.

6. The system according to claim 1, characterized in that the propeller towers are rotatable by 180 degrees using a protractor (470) having a straight portion positioned perpendicular to the first side wall, and a curved portion curving towards the stern of the air cushion vehicle.

7. The system according to claim 1, characterized in that each propeller tower includes a propeller, the blade angle of which is adjustable in such a way that the air flow produced with the propeller changes to the opposite direction.

8. The system according to claim 1, characterized in that the second mounting seat includes a rotatable shaft (603) at the second pivot point for mounting the second propeller tower.

9. The system according to claim 1, characterized in that the second mounting seat includes a rotatable inclined cap (702) at the second pivot point for mounting the second propeller tower.

10. An air cushion vehicle (400), including a cushion (485) and a system for controlling the air cushion vehicle (400) by propeller towers (401-404), characterized in that said system is as defined in claim 1.

11. A propeller tower (401-404) for moving an air cushion vehicle comprising a propeller (411-414) and a mounting seat (421-424) for mounting the propeller tower to the air cushion vehicle (400) in such a way that the mounting seat is rotatable at a pivot point (431-434) relative to the air cushion vehicle, characterized in that the tilt angle of the propeller tower is arranged to vary in response to the rotation of the mounting seat about its pivot point.

12. The propeller tower according to claim 11, characterized in that an edge portion (441, 442, 443, 444) of the mounting seat is arranged lower relative to a horizontal plane than an opposite edge portion (445, 446, 447, 448) in relation to the pivot point of the mounting seat.

13. The propeller tower according to claim 11, characterized in that the propeller is arranged to produce an air flow (451-454) directed away from the propeller, the direction of the air flow being arranged to change in response to rotation of the mounting seat about its pivot point.

14. The propeller tower according to claim 13, characterized in that the air flow produced by the propeller exerts an upwardly directed force (462, 464) when the air flow is directed downwardly from a horizontal plane, and a downwardly directed force (461, 463) when the air flow is directed upwardly from the horizontal plane.

15. The propeller tower according to claim 11, characterized in that the propeller tower is arranged to be installed at a position offset from a longitudinal centre axis of the air cushion vehicle (400).

16. The propeller tower according to claim 12, characterized in that the propeller is arranged to produce an air flow (451-454) directed away from the propeller, the direction of the air flow being arranged to change in response to rotation of the mounting seat about its pivot point.

* * * * *